United States Patent [19]
Blischke et al.

[11] Patent Number: 5,317,868
[45] Date of Patent: Jun. 7, 1994

[54] METHOD AND ARRANGEMENT FOR DETERMINING THE CONVERSION PERFORMANCE OF A CATALYTIC CONVERTER

[75] Inventors: Frank Blischke; Lutz Reuschenbach, both of Stuttgart; Erich Schneider, Kirchheim; Eberhard Schnaibel, Hemmingen, all of Fed. Rep. of Germany

[73] Assignee: Robert Bosch GmbH, Stuttgart

[21] Appl. No.: 983,318

[22] Filed: Nov. 30, 1992

[30] Foreign Application Priority Data

Dec. 10, 1991 [DE] Fed. Rep. of Germany ....... 4140618

[51] Int. Cl.$^5$ .............................................. F01N 3/00
[52] U.S. Cl. ......................................... 60/274; 60/277
[58] Field of Search ................... 60/274, 276, 277, 285

[56] References Cited

U.S. PATENT DOCUMENTS 4,622,809 11/1986 Abthoff et al. ...................... 60/274

FOREIGN PATENT DOCUMENTS

WO89/11030 11/1989 World Int. Prop. O. .
WO90/05240 5/1990 World Int. Prop. O. .
WO91/14861 10/1991 World Int. Prop. O. .

Primary Examiner—Noah P. Kamen
Attorney, Agent, or Firm—Walter Ottesen

[57] ABSTRACT

The invention is directed to a method and an arrangement for making an on-board diagnosis of a catalytic converter. For this purpose, the lambda value of the mixture is shifted in a targeted manner and the jump reaction of a signal of a lambda probe arranged rearward of the catalytic converter is utilized in order to detect the amount of mean-value shift for which the successively reduced oxygen-deficiency input quantities or excess input quantities in the catalytic converter drop below the oxygen-storage capability thereof.

21 Claims, 7 Drawing Sheets

METHOD AND ARRANGEMENT FOR
DETERMINING THE CONVERSION
PERFORMANCE OF A CATALYTIC CONVERTER

FIELD OF THE INVENTION

The invention relates to a method and an arrangement for diagnosing the state of a catalytic converter which is utilized for reducing the toxic emissions during operation of an internal combustion engine.

BACKGROUND OF THE INVENTION

For obtaining the lowest possible toxic emissions, it is desirable to detect and replace catalytic converters having a reduced conversion performance. Statutory requirements exist for systems which permit detecting the reduction of conversion performance with on-board means (on-board diagnosis). In known systems, such as disclosed in U.S. Pat. No.4,622,809, the signals of a first lambda probe arranged forward of the catalytic converter and the signals of a second lambda probe arranged rearward of the catalytic converter are compared for diagnostic purposes. The first lambda probe is also the control probe. U.S. patent application Ser. No. 738,360, filed Jul. 31, 1991, now U.S. Pat. No. 5,203,165, also shows a system of the kind described above.

For the above purpose, the periodic oscillation of the lambda value is used with the periodic oscillation being caused by the two-level characteristic of the mixture control method. This periodic oscillation occurs at least in steady-state operating conditions. The mean value of this oscillation corresponds ideally to the control desired value such as lambda=1. The half periods, in which a lean mixture is present, are associated with an oxygen excess in the exhaust gas; whereas, an oxygen deficiency is present in the other half periods because of a rich mixture composition. Based on its capability to buffer the oxygen deficiency, as well as the oxygen excess within certain limits, the catalytic converter exercises an averaging influence on the oxygen content of the exhaust gas. This influence is detected in known methods by a comparison of the amplitudes of the signals of the exhaust-gas probes arranged forward and rearward of the catalytic converter and is applied for evaluating the conversion performance.

A disadvantage of the above-described method is seen in the very definite dependency of the signal amplitudes of other individual parameters such as the temperature and the chemical and thermal aging of each individual one of the two probes. The evaluation of the conversion performance according to these methods is therefore burdened with corresponding uncertainties. On the one hand, this leads to the situation that catalytic converters which no longer satisfy the statutory requirements cannot be detected so that the toxic emissions increase. On the other hand, it is also possible that catalytic converters which are still adequate are already evaluated as being defective and, possibly, are exchanged too early with economic disadvantages for the owner of the motor vehicle.

SUMMARY OF THE INVENTION

It is an object of the invention to provide a method and an arrangement for evaluating the conversion performance of catalytic converters which is not burdened by the above-mentioned uncertainties.

The method of the invention is for evaluating the conversion performance of a catalytic converter which reduces the quantity of unwanted toxic components in the exhaust gas of an internal combustion engine. The engine has a lambda control, a first exhaust-gas probe mounted forward of the catalytic converter and acting as a control probe, and a second exhaust-gas probe mounted rearward of the catalytic converter, the first and second exhaust-gas probes emitting first and second signals, respectively. The method includes the steps of: modulating the fuel-metering signal in specific operating states of the engine to provide a modulated fuel-metering signal; determining the mean value of the fuel-metering signal; deliberately shifting the mean value of the modulated fuel-metering signal until the second signal either no longer passes through pregiven threshold values and that from the extent of the needed shift, a conclusion is drawn as to the oxygen storage capacity of the catalytic converter or, the shift of the mean value is carried out until the second signal should no longer pass through pregiven threshold values while the catalytic converter is still operational; and, issuing a fault announcement when the oxygen storage capacity is evaluated as being inadequate.

Experiments have shown that carrying out the method permits reliable statements to be made as to whether the catalytic converter can still maintain the exhaust-gas limit values specified by statute.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
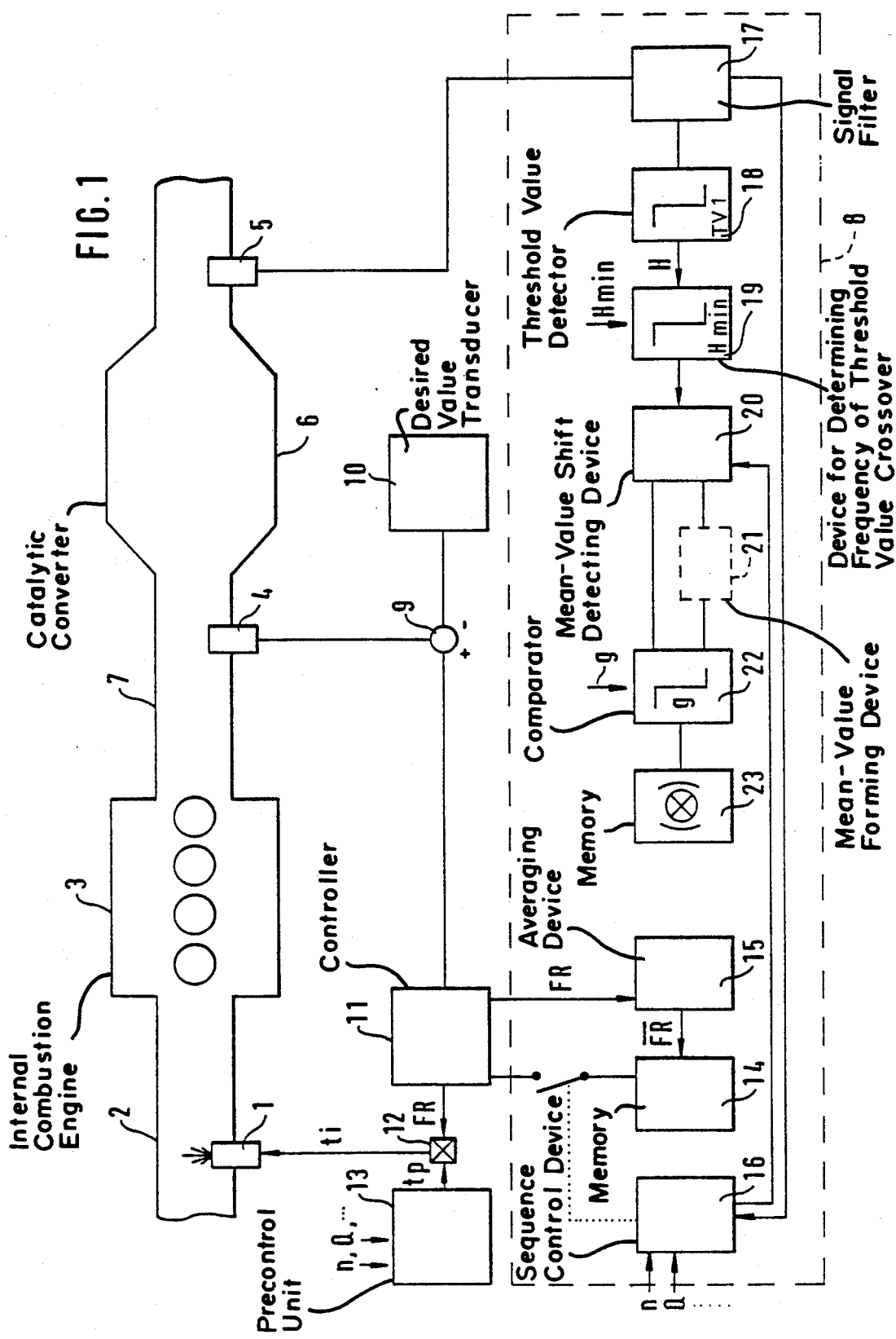
FIG. 1 is a block diagram of an arrangement for determining the conversion performance of a catalytic converter.

FIG. 1 shows a fuel-metering device 1 mounted in the intake pipe of an internal combustion engine 3. Exhaust-gas probes 4 and 5 are mounted forward and rearward of the catalytic converter 6 in the exhaust-gas pipe 7 of the engine. In addition, the following are provided: a comparator 9 for comparing the output signal of the exhaust-gas probe 4 with a control desired value, a desired-value transducer 10, a controller 11, a multiplier 12 as well as a precontrol unit 13. The above are known from the state of the art and are supplemented by the elements shown within the broken line 8. These elements include means 14 for storing and emitting controller parameters and open-loop control values for influencing the performance of the controller 11, means 15 for averaging a control factor FR, sequence control means 16, a signal filter 17 for the signal of the exhaust-gas probe 5, a threshold-value detector 18, means 19 for determining the frequency with which the threshold value is exceeded in detector 18, means 20 for detecting the mean value shift, a means 21 (optional) for forming the mean value of shifts according to another embodiment, means 22 for comparing the mean value shift with a limit value and means 23 for emitting and/or storing a fault signal.

During operation of the internal combustion engine, precontrol values tp from the precontrol means 13 are multiplied in a multiplier 12 by a control factor FR. The fuel-metering means 1 is driven by the fuel-metering signal ti obtained in this way. The fuel-metering means 1 can be, for example, an injection valve. The fuel/air mixture formed in the intake pipe 2 reaches the exhaust-gas pipe 7 as exhaust gas after combustion in the engine 3. The residual oxygen content of the exhaust gas is detected in the exhaust-gas pipe 7 by the exhaust-gas probes 4 and 5. The signal of the probe 4 is compared to a desired value from the desired-value transducer means 10 in the comparator means 9. The comparison result is then used as an input variable for the PI-controller 11 which emits the above-mentioned control factor FR as an output signal. In most cases, control is to a lambda value of 1 since an optimum of conversion of the different toxic materials in the catalytic converter 6 is obtained with this value. The oxygen content of the exhaust gas is changed by the catalytic reaction and by the oxygen storage of the catalytic converter and is detected by the second exhaust-gas probe 5.

As described up to this point, the control loop having the catalytic converter and a first exhaust-gas probe, which is mounted forward of the catalytic converter as a control probe and a second exhaust-gas probe, which detects the oxygen content of the exhaust gas rearward of the catalytic converter, is known from the state of the art.

The components of the block 8 described below are also used for carrying out the method of the invention and are activated in specific operating states for carrying out the method of the invention. The means 14 influences the control factor FR in a controlled manner and intervenes in such a test phase, which is triggered by the sequence-control means 16, in the control oscillation in such manner that the mean value of the control factor is shifted in a predetermined manner. A signal filter 17 transmits only relatively rapid changes of the signal of the exhaust-gas probe 5 and blocks a slow change. The signal filter 17 is arranged between the exhaust-gas probe 5 and the threshold-value detector 18. Detector 18 registers each time that a rapid change in the signal of the exhaust-gas probe 5 takes place and the change is greater than a pregiven threshold value (threshold value 1). From this, means 18 forms a signal H for the frequency of this occurrence and this frequency is compared to a pregiven threshold value Hmin. Such a rapid change is present when a change in the mixture composition from rich to lean, or vice versa becomes noticeable in the signal of the rearward exhaust-gas probe 5.

Based on the above-mentioned averaging influence of the catalytic converter on the oxygen content of the exhaust gas, this is generally not the case, for example, for a new catalytic converter. In this case, the exhaust-gas probe does not supply an image of the signal trace of the exhaust-gas probe 4 (see FIG. 2e) during normal control operation. In this case then, the method of the invention affords no advantages with respect to the state of the art. However, this does not affect the useability of the method since this response characterizes a new catalytic converter which still has maximum conversion performance. The triggering of the catalytic converter test function for this case can be suppressed via the connection of the filter 17 to the sequence control 16.

If in contrast, the catalytic converter test function was initiated and the frequency H of the signal level change of the rearward probe no longer exceeds the threshold value Hmin, the measure of the mean-value shift (a) or (b) reached up to this time point (for example, by a measurement of the time duration between triggering the method and dropping below Hmin) is detected by means 20 and compared in comparator means 22 to a limit value (g). The limit value (g) is determined in accordance with the requirements of the statutes relating to exhaust gas. A catalytic converter having a conversion capability which no longer corresponds to statutory requirements is characterized in that the value (a) or (b) of the mean-value shift fixed for this converter exceeds the determined limit value (g). For this case, means 23 is provided for signaling this fault to the driver or for storing this fault for later control such as in the context of a maintenance service. Several of the means mentioned above are realized advantageously by computer functions.

Figure 2:
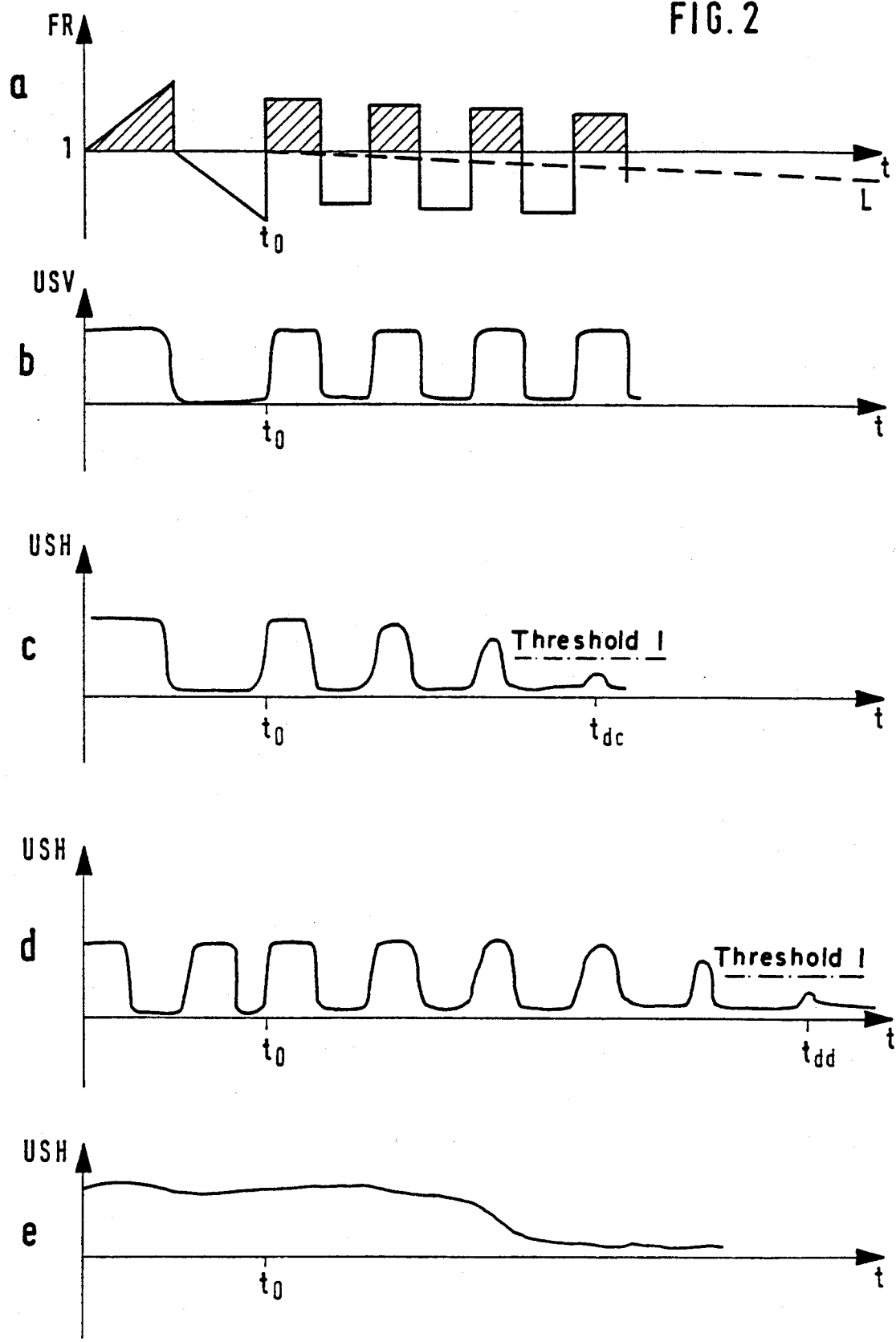
FIGS. 2a to 2e show exemplary signal traces as they occur at various locations in the arrangement of FIG. 1.

The execution of the method of the invention will now be described with reference to FIG. 2 wherein different signal traces are shown as a function of time. FIG. 2a shows the trace of the control factor FR and FIG. 2b shows the signal USV of the forward exhaust-gas probe 4 which corresponds to the trace in FIG. 2a. FIGS. 2c and 2d show corresponding signal traces USH(t) of the rearward probe 5 as they adjust for two different stages of performance loss of the catalytic converter 6. In contrast, FIG. 2e shows the signal USH of the rearward exhaust-gas probe as it occurs for a new catalytic converter. As mentioned above, the method of the invention is not intended to be carried out in this case. The oxygen-storage capability of the catalytic converter is not yet limited by aging phenomena. This leads to the situation that the influence of the catalytic converter on the oxygen content of the exhaust gas essentially evens out the control oscillation so that the rearward exhaust-gas probe does not reflect the signal response of the forward exhaust-gas probe. This condition of the catalytic converter can therefore be recognized in that a check is made as to whether the signal of the rearward probe changes the signal level with a least frequency.

At this point it is noted that time shifts between the signals occur unavoidably because of gas running time and contribute decisively to the occurrence of lambda oscillations in the normal control operation. These time shifts are not shown for reasons of clarity.

In FIG. 2a, the control factor FR first carries out the known control oscillation about the mean value 1. This control oscillation is characterized by the proportional and integral components. Thereafter, the FR trace shown is controlled starting at the time point $t_0$. The transition should take place in such a manner that the surface content of the first hatched rectangle corresponds approximately to the surface content of the triangle shown to the left of $t_0$. In this way, a jump-like change of the load on the catalytic converter is avoided.

In this embodiment, a square wave trace has a slowly varying offset whereby the mean value of this signal slowly runs down along the dash line L to FR-values less than 1. This leads to a lean shift of the mean lambda value provided that the fuel quantity is multiplicatively influenced by the control factor as described above.

A rich mixture and therefore a deficiency of oxygen is present during those time spans in which FR is greater than 1. In these time spans, oxygen stored previously in the catalytic converter is released and the surfaces shown hatched can therefore be viewed as a measure of the deficiency of the oxygen input quantity in the catalytic converter. In the same manner, the areas lying below the FR=1 line (lean phase) represent an excess oxygen input quantity. It becomes clear that the oxygen-deficient input quantities in this example become successively less.

As shown in FIG. 2b, the exhaust-gas probe 4 arranged forward of the catalytic converter shows no significant reaction to the modulation of the mixture composition. The signal USV shows the rich-lean or reverse change in each case with a low signal level being characteristic for oxygen excess.

Other relationships are shown in FIGS. 2c and 2d which show the corresponding signal USH of the rearward exhaust-gas probe for two different stages of performance loss of the catalytic converter.

In the case of curve 2c, the catalytic converter still provides the comparatively higher oxygen-storage capability and therefore has the higher conversion performance.

Both signal traces are produced in the manner described below. At the start of the test phase, $t_0$, the particular oxygen-deficient input quantities are greater than the quantities of oxygen stored in the catalytic converter in the previous oxygen-excess phases so that the oxygen deficiency becomes manifest in the signal of the exhaust-gas probe 5.

Here it is assumed that the oxygen-storage capability of the catalytic converter at the start of the test phase is less than the oxygen-deficient input quantity. The parameters of the mixture modulation must be correspondingly matched to the volume of the catalytic converter.

The catalytic converter is charged in each case up to the limit of its oxygen-storage capability in the lean phases (FR>1) because of the overweight (present for $t > t_0$) of the non-hatched rectangular areas (representing the oxygen input quantity) lying below the zero line.

The rearward gas probe registers the rich phase (FR>1) when the oxygen-deficient input quantity is greater than the oxygen-storage capability of the catalytic converter.

With advancing test duration, the oxygen-deficient input quantity becomes successively less and finally drops below the oxygen quantity which can be stored in the catalytic converter. The oxygen quantity stored in the oxygen-excess phases is then no longer compensated by the oxygen-deficient input quantity and the signal USH of the exhaust-gas probe 5 in this case no longer reaches the threshold value (threshold 1) shown by the dot-dash line and now only shows a lean mixture. The lower the oxygen-storage capacity of the catalytic converter, the later the time point identified by $t_{dd}$ in FIG. 2d will occur. In this way, the amount of the oxygen-deficient input quantity is used to some extent as a criteria for the oxygen-storage capability of the catalytic converter. As already mentioned, the signal trace shown in FIG. 2d will occur for a comparatively older catalytic converter having an already greatly reduced oxygen-storage capability.

In the same manner, the oxygen input quantity can be used as a criteria in the case of a targeted shift in the rich direction with the particular oxygen input quantity being completely released in the rich phases.

It is emphasized here that in both cases the mean lambda value is shifted until the signal of the rearward lambda probe no longer jumps. With the method of the invention, it is in this way possible to apply the jump characteristic of the rearward exhaust-gas probe to some extent for catalytic converter diagnosis. The advantages of the method of the invention are provided because of the comparatively good stability of the position of the jump in the exhaust-gas probe output signal with reference to temperature change and performance loss.

In practice, the one-time omission of the probe signal change would not be awaited which can also possibly be caused by statistical fluctuations in the exhaust-gas flow. Rather, the observation is made as to whether the comparator threshold value (threshold 1) is passed through in a pregiven time span with a pregiven minimum frequency $H > H_{min}$. Furthermore, it is noted that the relatively large slope of the mean-value shift was selected simply to provide a better illustration. In practice, the slope would be selected to be less for reasons of the resolution of the method so that the signal of the rearward gas probe passes the threshold value between test start and test end more often than shown.

FIG. 3a emphasizes the relationship between the time duration $t_d$ and the amount of the mean-value shift (a) corresponding thereto. The value $t_{dg}$ is a lower limit value for the evaluation of the conversion capacity. The value $t_d$ determined during a test phase is assigned to the mean-value displacement (a) as shown. If this mean value $t_d$ is greater than this limit value, this is an indication of a catalytic converter which no longer has an adequate performance capability.

The test result can, however, be falsified when the actual lambda mean value is not selected as the start point of the shift. To preclude faulty diagnoses, it is therefore purposeful (in advance of the start of the shift), for example, to average the value of the control factor FR or of the signal of the forward exhaust-gas probe over several oscillation periods and to use the obtained value as start value for the shift.

Furthermore, this mean value can be shifted with respect to the desired lambda value 1 by contamination phenomena or aging phenomena of the control probe 4. The falsification of the test results by this error, which cannot be eliminated by the indicated averaging, can be compensated by the method shown in FIG. 3b or also by the method shown in FIGS. 3c and 3d.

In the method shown in FIG. 3b, the mean value of the control position is shifted sequentially in both directions and the extent of the particular shifts (a) and (b) is detected. The actual mean-value shift results then as a mean value from the shifts (a, b) in both directions. In FIG. 3b, the shift (a) shows, for example, the lean shift and (b) shows the rich shift.

A further possibility is carrying out a shift from "adequate rich" toward "adequate lean", or vice versa, in one operation. Here, the total shift width is obtained at once while the signal of the forward probe is mirrored in the signal of the rearward probe.

This procedure is shown in FIGS. 3c and 3d.

FIG. 3c shows the amount of the mean-value shift over time for this embodiment and FIG. 3d shows the signal of the rearward probe corresponding thereto. The test is started at time point $t_0$ with a mean-value shift ($a_0$) in the direction rich. This start shift is selected so large that the remaining (lesser) excess input quantities are less than the oxygen-storage capacity of a catalytic converter which is still good. In this case, the excess input quantity is not adequate in order to occupy the oxygen-storage places which have become free because of the previous input quantity of the catalytic converter by oxygen deficiency. The probe 5 therefore first registers only oxygen deficiency (rich mixture) as an average. With decreasing mean-value shifts, the excess input quantities increase until, at time point $t_1$, the mixture modulation also becomes noticeable in the signal of the rearward probe. A further mean-value shift into the lean range leads then (time point $t_2$) to the condition that the rearward probe registers on average no oxygen deficiency since the deficient input quantities no longer are adequate to empty the oxygen-storage places occupied in the previous excess phases. The greater the time span $t=t_2-t_1$ (that is, the corresponding mean-value shift $a+b$), the poorer is the catalytic converter. As already mentioned, this method can also be carried out in the reverse direction, that is, with a mean-value shift starting in the lean range.

In FIG. 2a, the mean-value shift of the mixture composition is illustrated by a controlled rectangular trace having a slowly-varying offset.

Figure 4:
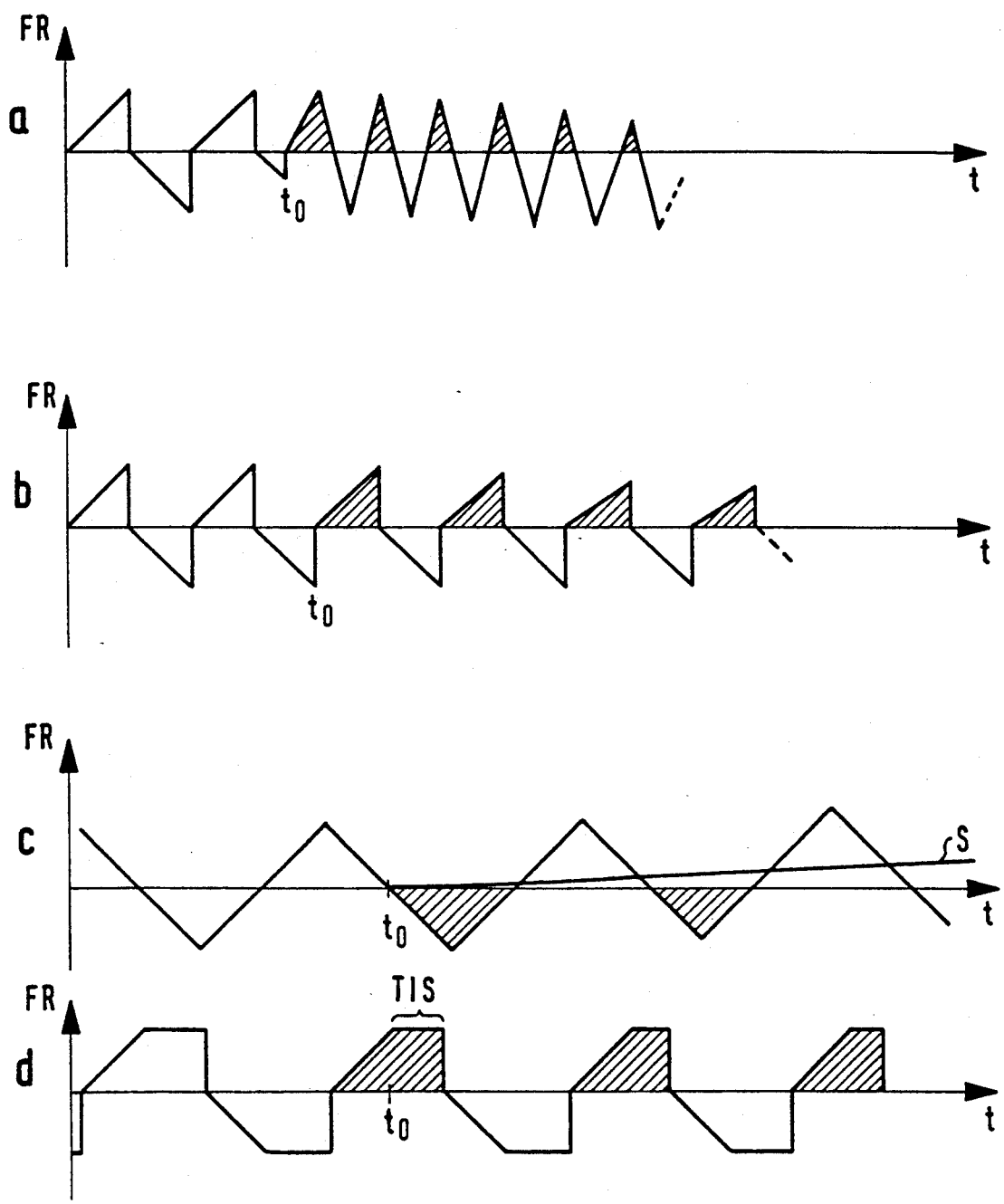
FIGS. 4a to 4d show signal traces which occur when carrying out further embodiments of the method of the invention; and, FIGS. 5a to 5d show flowcharts for the computer-controlled execution of the method of the invention.

However, the invention is not limited to this special signal shape but includes all further signal traces which affect a shift of the mean value. A further example for a control intervention on the mixture formation is shown in FIG. 4a wherein a triangular trace having a slowly varying offset is shown.

In addition to these controlled traces of the mixture formation, the method of the invention can be carried out by retaining the control operation. Examples thereof are shown in FIGS. 4b, 4c and 4d. In the method of FIG. 4b, the integrator slopes and the proportional jumps are reduced; whereas, in the case of FIG. 4d, the time TIS, in which the integration value is retained without changes, is reduced in a step-wise manner. An FR-trace is shown in FIG. 4c as it results for a shift of the closed-loop control threshold value along the line S. In contrast to the other illustrated examples, a shift in the direction rich is provided in this case. What is essential for carrying out the method of the invention is in all cases the successive reduction of the hatched areas, which, for the mean-value shifts shown in the examples, define a measure for the particular oxygen deficiency or excess input quantity in the catalytic converter.

FIGS. 5a to 5d show examples of flowcharts for the computer-controlled execution of the method of the invention.

Figure 5A:
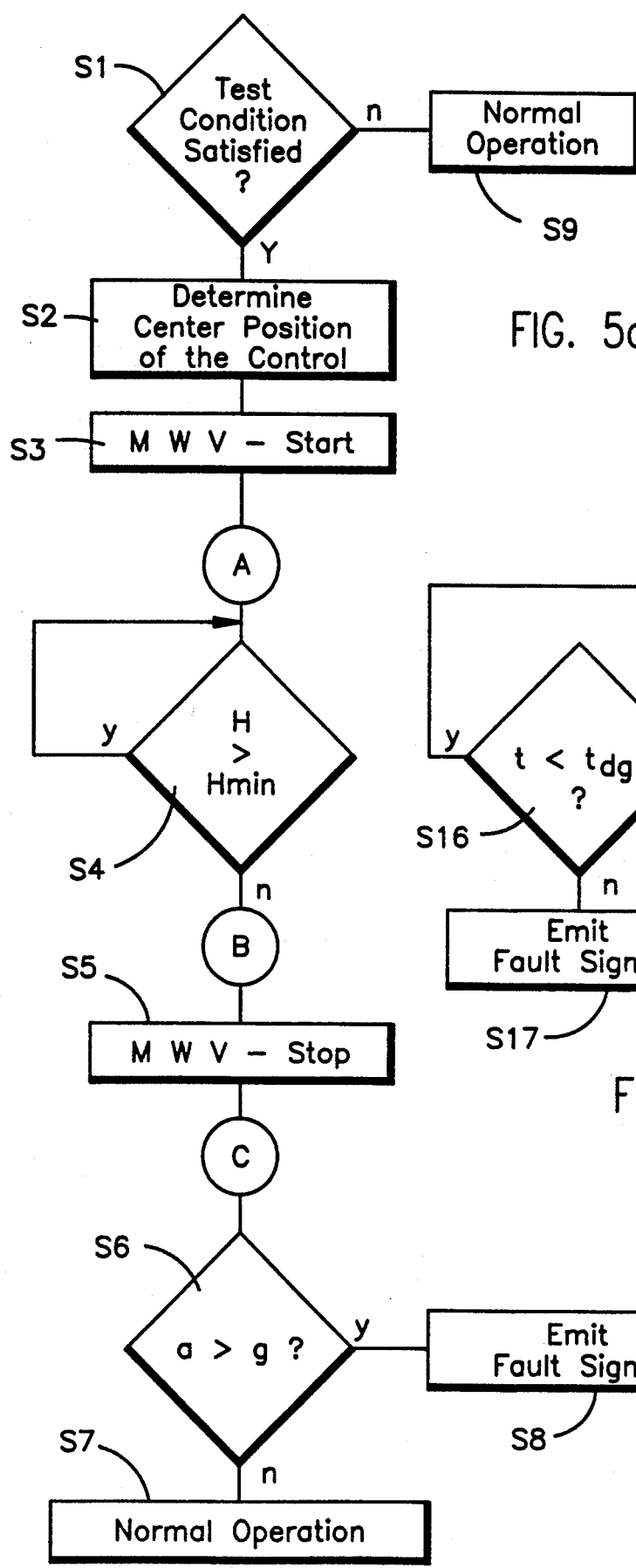

In the flowchart of FIG. 5a, a check is made in a step s1 as to whether preconditions necessary for carrying out the test are satisfied. These preconditions include: the elapse of a minimum operating time since the test was carried out last in order that the test not be carried out too often, operational readiness of both probes, adequate temperature of the engine and catalytic converter, at least an intermittent mirroring of the mixture modulation in the signal of the rearward probe even during normal control operation and the presence of an operating state having constant reduced load such as idle. If one of the preconditions is not satisfied, then normal operation is retained (step s9). Otherwise, the mean position of the control is determined in a step s2 and utilized in step s3 as a start value for the mean-value shift MWV.

In a step s4, a check is made as to whether the signal of the rearward probe passes the threshold value (threshold 1) in a pregiven time span with a pregiven minimum frequency $H>Hmin$. This step is repeatedly carried out for further increasing shift of the lambda mean value until the inquiry is answered in the negative. In this case, the mean-value shift is stopped and the value (a) reached up to that time is fixed in a step s5. Thereafter, a comparison of (a) to a limit value (g) takes place in step s6. The limit value (g) marks the boundary between adequate and inadequate conversion performance. When this limit value is passed, a signal characterizing fault condition is emitted in step s8. If in contrast, the conversion performance is still adequate then a switchover to normal operation takes place again without delay in step s7.

Figure 5B:
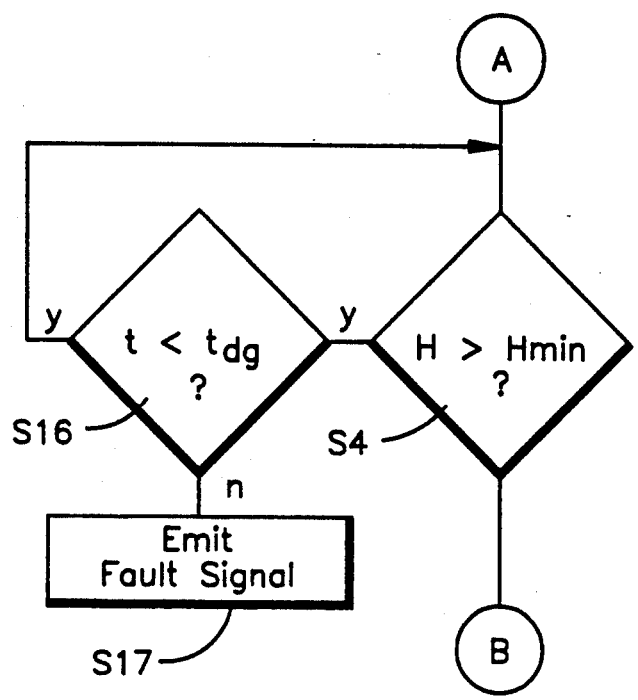

The flowchart of FIG. 5b illustrates a departure from the method described. The method steps s4, s16 and s17 then replace the method step s4 of FIG. 5a. The departure comprises essentially that now, in step s16, it is additionally checked as to whether the test duration (t), during which the mean-value shift is already interrupted, is less than a limit value $t_{dg}$ up to which an operationally capable catalytic converter should have been detected. Exceeding this limit value leads to the emission of a corresponding fault signal in step s17.

Figure 5C:
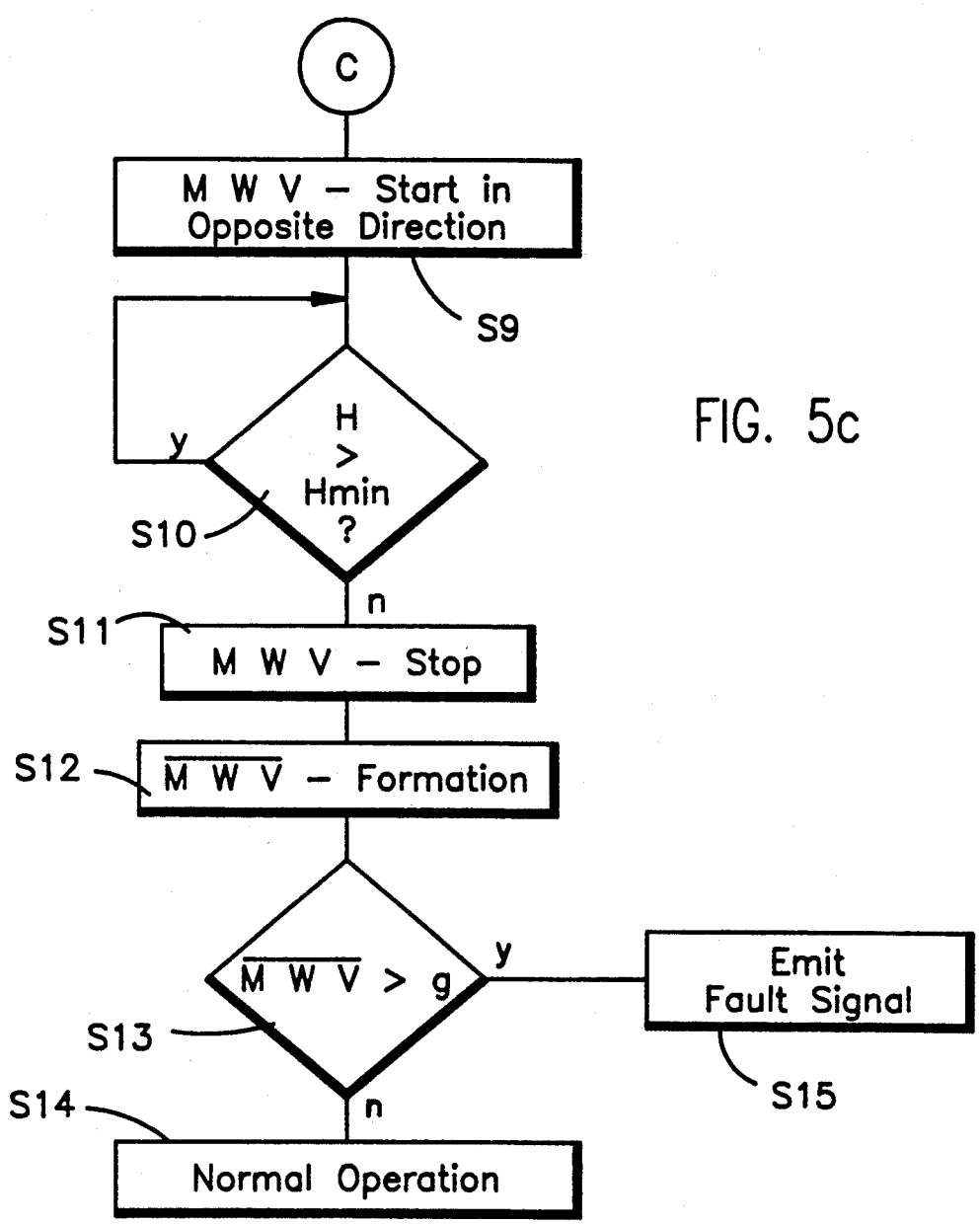

The flowchart of FIG. 5c contains additional method steps as they are necessary for carrying out the method according to the embodiment of FIG. 3b. For this purpose, a step s9 continues at the mark C of FIG. 5a wherein the mean-value shift is started in the other direction. For example, if the value (a) for the lean shift is determined up to the mark C, then in like manner, in step s11, a value (b) is determined for the rich shift in that step s10 is run through with increasing rich shift until the threshold value (threshold 1) is no longer dropped below an adequate number of times by the signal of the rearward probe. The amount of the threshold value (threshold 1) can be different in the cases of rich and lean shifts. In step s12, the formation of the mean value from the shifts (a) and (b) follows. A comparison is made in step s13 of the mean value with the pregiven limit value (g). In dependence upon the result of this comparison, a fault signal is emitted in step s15 or, without emission of a signal, a switchover takes place to normal operation in step s14.

Figure 5D:
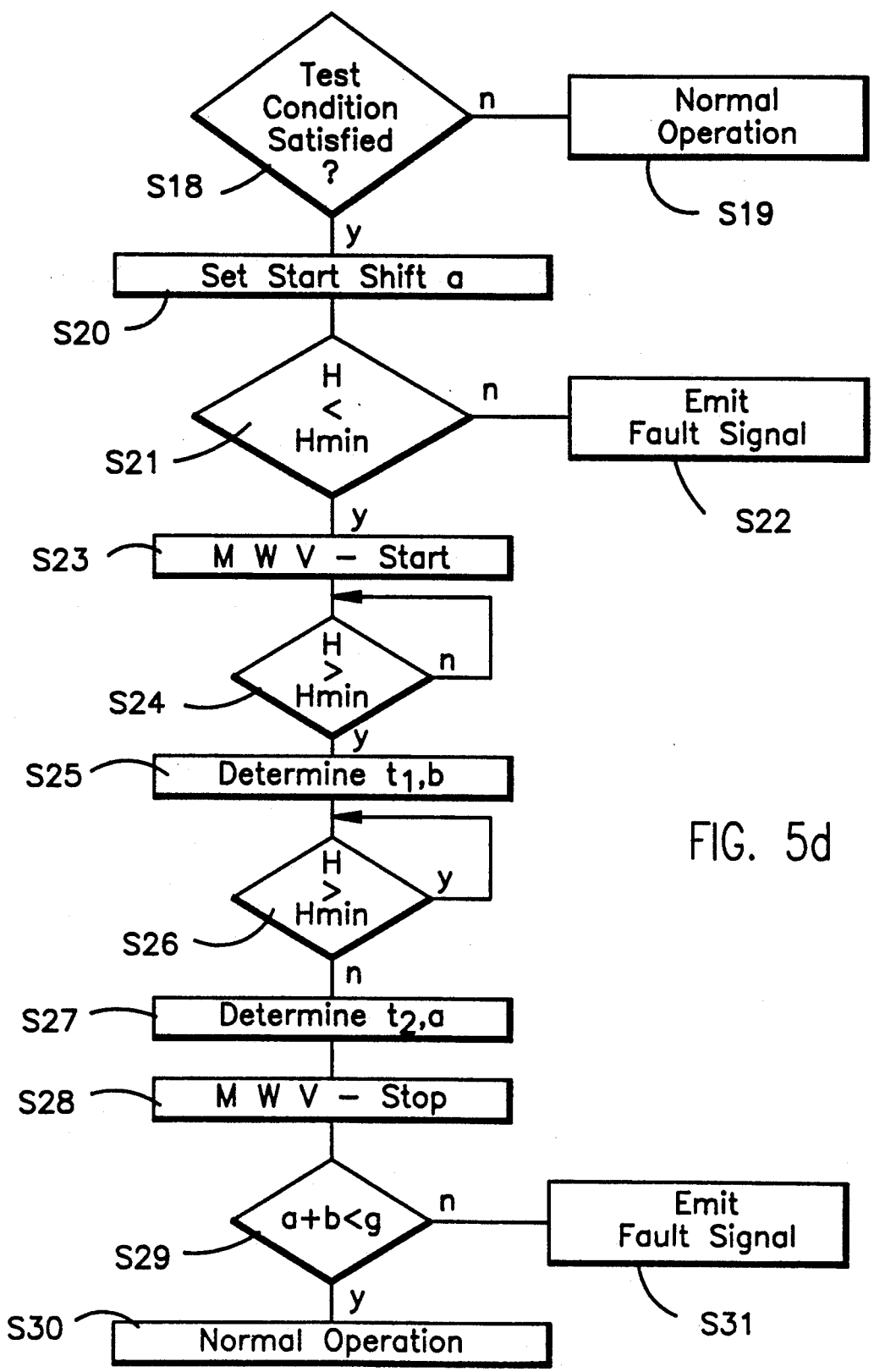

FIG. 5d relates to the embodiment of FIGS. 3c and 3d. First, and in the manner of the embodiments already described, a check is made as to whether the test conditions are satisfied. This step is identified by s18 and corresponds to step s1 of FIG. 5a. If this inquiry is answered in the negative, normal operation is retained (step s19). Otherwise, a start shift $a_0$ of the mean value of the control factor takes place in step s20. Step s21 is provided for the check as to whether on average sufficiently few threshold value crossovers of the signal USH of the rearward probe take place after the shift. If this is already not the case for the start value of the mean value shift, then a fault announcement takes place in step s22.

Figure 3:
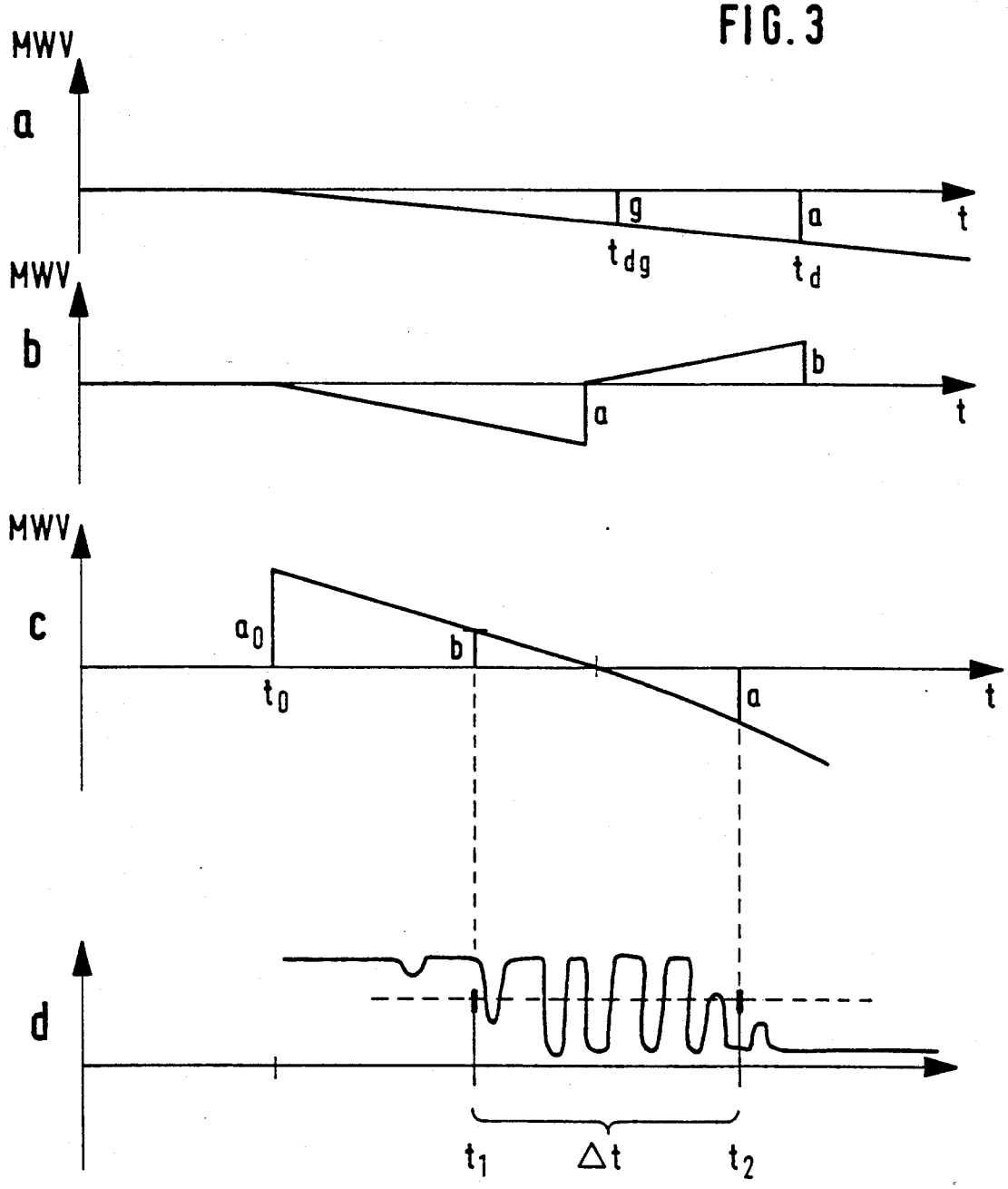
FIG. 3a shows the evaluation of the signal traces of FIGS. 2a to 2e and FIGS. 3b to 3d show additional embodiments of the method of the invention.

For the relationships shown in FIG. 3, the condition checked in step s21 is however first satisfied and a step s23 then follows wherein the mean-value shift MWV (now starting from start value $a_0$) is started. Thereafter, step s24 is repeatedly passed through until threshold value crossovers of USH occur with a minimum frequency $H>Hmin$. If this is the case, then in step s25, the current value of the mean-value shift (given by the values b or $t_1$ in FIGS. 3c and 3d, respectively) is determined. For continuing mean-value shift, a determination is made up to which value (a or $t_2$ in FIGS. 3c and 3d) the threshold value crossovers occur with the minimum frequency Hmin. This determination is made by repeated passthrough of step s25 in combination with step s27. Thereafter, the mean-value shift in step s28 is stopped and the total mean-value shift a +b is computed in order to make a comparison to a pregiven limit value. When the limit value is exceeded, a fault announcement takes place in step s31; otherwise, a return again to normal operation takes place in step 30.

It is understood that the foregoing description is that of the preferred embodiments of the invention and that various changes and modifications may be made thereto without departing from the spirit and scope of the invention as defined in the appended claims.

What is claimed is:

1. A method for evaluating the conversion performance of a catalytic converter which reduces the quantity of unwanted toxic components in the exhaust gas of an internal combustion engine, the engine having a lambda control, a first exhaust-gas probe mounted forward of the catalytic converter and acting as a control probe, and a second exhaust-gas probe mounted rearward of the catalytic converter, said first and second exhaust-gas probes emitting first and second signals, respectively, the method comprising the steps of:

modulating the fuel metering signal in specific operating states of the engine to provide a modulated fuel-metering signal;

determining the mean value of said fuel-metering signal;

deliberately shifting said mean value of said modulated fuel-metering signal until said second signal no longer passes through pregiven threshold values and that from the extend of the needed shift, a conclusion is drawn as to the oxygen storage capacity of the catalytic converter; and, issuing a fault announcement when said oxygen storage capacity is evaluated as being inadequate.

2. The method of claim 1, wherein said mean value is shifted in a direction toward one of a leaner mixture composition and a richer mixture composition; the extent of the shift toward one of said leaner mixture composition and said richer mixture composition is determined; and, a conclusion is drawn as to the oxygen storage capacity from the magnitude of the sum of both shifts.

3. The method of claim 2, wherein said shift of said mean value is carried out during control operation via a proportional component.

4. The method of claim 2, wherein said shift of said mean value is carried out during control operation via an integral component.

5. The method of claim 2, wherein said shift of said man value is carried out during control operation via an unsymmetrical switchover delay when there is a lean-rich change and when there is a rich-lean change.

6. The method of claim 2, wherein said shift of said mean value is carried out during control operation via a change of a threshold value for said first signal.

7. The method of claim 1, wherein lambda control includes a lambda controller and said shift of mean value is achieved via the open-loop control of a pregiven lambda response starting from the mean position of said lambda controller.

8. The method of claim 7, wherein said response has a triangular wave shape and said response is utilized to modulate said fuel metering signal so as to cause the mean value of said fuel metering signal to be shifted to one of a rich mixture and a lean mixture.

9. The method of claim 1, wherein said method is carried out only when the amplitude of said second signal exceeds a threshold value a minimum number of times.

10. An arrangement for evaluating the conversion performance of a catalytic converter which reduces the quantity of unwanted toxic components in the exhaust gas of an internal combustion engine, the engine having a lambda control for controlling a fuel-metering signal, a first exhaust-gas probe mounted forward of the catalytic converter and acting as a control probe, and a second exhaust-gas probe mounted rearward of the catalytic converter, said first and second exhaust-gas probes emitting first and second signals, respectively, the arrangement comprising:

modulating means for modulating said fuel-metering signal to obtain a mean value of said fuel-metering signal;

means for deliberately shifting said mean value; and, means for comparing said second signal to pregiven threshold values while said mean value is shifted until said second signal no longer passes through said threshold values.

11. The arrangement of claim 10, further comprising means for determining the extent of said shift toward rich as well as toward lean.

12. The arrangement of claim 11, further comprising means for comparing the amplitude of said second signal to a threshold value to determine if said second signal still passes through said threshold values.

13. A method for evaluating the conversion performance of a catalytic converter which reduces the quantity of unwanted toxic components in the exhaust gas of an internal combustion engine, the engine having a lambda control, a first exhaust-gas probe mounted forward of the catalytic converter and acting as a control probe, and a second exhaust-gas probe mounted rearward of the catalytic converter, said first and second exhaust-gas probes emitting first and second signals, respectively, the method comprising the steps of:

modulating the fuel metering signal in specific operating states of the engine to provide a modulated fuel-metering signal;

determining the mean value of said fuel-metering signal;

deliberating shifting said mean value of said modulated fuel-metering signal until said second signal no longer passes through pregiven threshold values while said catalytic converter is still operational; and, issuing a fault announcement when said oxygen storage capacity is evaluated as being inadequate.

14. The method of claim 13, wherein said mean value is shifted in a direction toward one of a leaner mixture composition and a richer mixture composition; the extent of the shift toward one of said leaner mixture composition and said richer mixture composition is determined; and, a conclusion is drawn as to the oxygen storage capacity from the magnitude of the sum of both shifts.

15. The method of claim 14, wherein said shift of said mean value is carried out during control operation via a proportional component.

16. The method of claim 14, wherein said shift of said mean value is carried out during control operation via an integral component.

17. The method of claim 14, wherein said shift of said mean value is carried out during control operation via an unsymmetrical switchover delay when there is a lean-rich change and when there is a rich-lean change.

18. The method of claim 14, wherein said shift of said mean value is carried out during control operation via a change of a threshold value for said first signal.

19. The method of claim 13, wherein lambda control includes a lambda controller and said shift of mean value is achieved via the open-loop control of a pre-given lambda response starting from the mean position of said lambda controller.

20. The method of claim 19, wherein said response has a triangular wave shape and said response is utilized to modulate said fuel metering signal so as to cause the mean value of said fuel metering signal to be shifted to one of a rich mixture and a lean mixture.

21. The method of claim 13, wherein said method is carried out only when the amplitude of said second signal exceeds a threshold value of a minimum number of times.

* * * * *

UNITED STATES PATENT AND TRADEMARK OFFICE
CERTIFICATE OF CORRECTION

PATENT NO. : 5,317,868

DATED : June 7, 1994

INVENTOR(S) : Frank Blischke, Lutz Reuschenbach, Erich Schneider and Eberhard Schnaibel It is certified that error appears in the above-identified patent and that said Letters Patent is hereby corrected as shown below:

In column 9, line 38: delete "extend" and substitute -- extent -- therefor.

In column 9, line 58: delete "man" and substitute -- mean -- therefor.

In column 10, line 51: delete "deliberating" and substitute -- deliberately -- therefor.

In column 12, line 11: delete "of".

Signed and Sealed this

Twenty-fifth Day of October, 1994

Attest:

BRUCE LEHMAN

Attesting Officer

Commissioner of Patents and Trademarks